United States Patent
Mazelsky

[11] 3,882,590
[45] May 13, 1975

[54] METHOD OF ASSEMBLING ENERGY ABSORBERS

[75] Inventor: Bernard Mazelsky, West Covina, Calif.

[73] Assignee: ARA, Inc., West Covina, Calif.

[22] Filed: Aug. 29, 1974

[21] Appl. No.: 501,837

Related U.S. Application Data

[62] Division of Ser. No. 311,299, Dec. 1, 1972, Pat. No. 3,851,374.

[52] U.S. Cl. .................. 29/447; 29/173; 29/434
[51] Int. Cl. .............................................. B23p 11/02
[58] Field of Search ............ 29/173, 434, 447, 505, 29/446, 455, 450, 456, 464, 235; 188/1 R; 74/492

[56] References Cited
UNITED STATES PATENTS

| | | | |
|---|---|---|---|
| 2,329,000 | 9/1943 | Rembert | 29/450 |
| 3,345,732 | 10/1967 | Brower | 29/447 X |
| 3,355,202 | 11/1967 | Shannon | 287/119 |
| 3,540,119 | 11/1970 | Manoly | 29/447 X |
| 3,736,645 | 6/1973 | Fannin et al. | 29/434 X |

Primary Examiner—C. W. Lanham
Assistant Examiner—Victor A. Di Palma
Attorney, Agent, or Firm—Herzig & Walsh

[57] ABSTRACT

Methods of assembling energy absorbers of the type comprising telescoping tubes having a helically wound energy absorbing element between the tubes comprising the steps of helically winding the convolutions of wire onto the inner telescoping tube and fitting the tubes in telescoping relationship with the helical winding between them by expanding the outer telescoping member by heating and the shrinking the outer member onto the helical winding.

6 Claims, 12 Drawing Figures

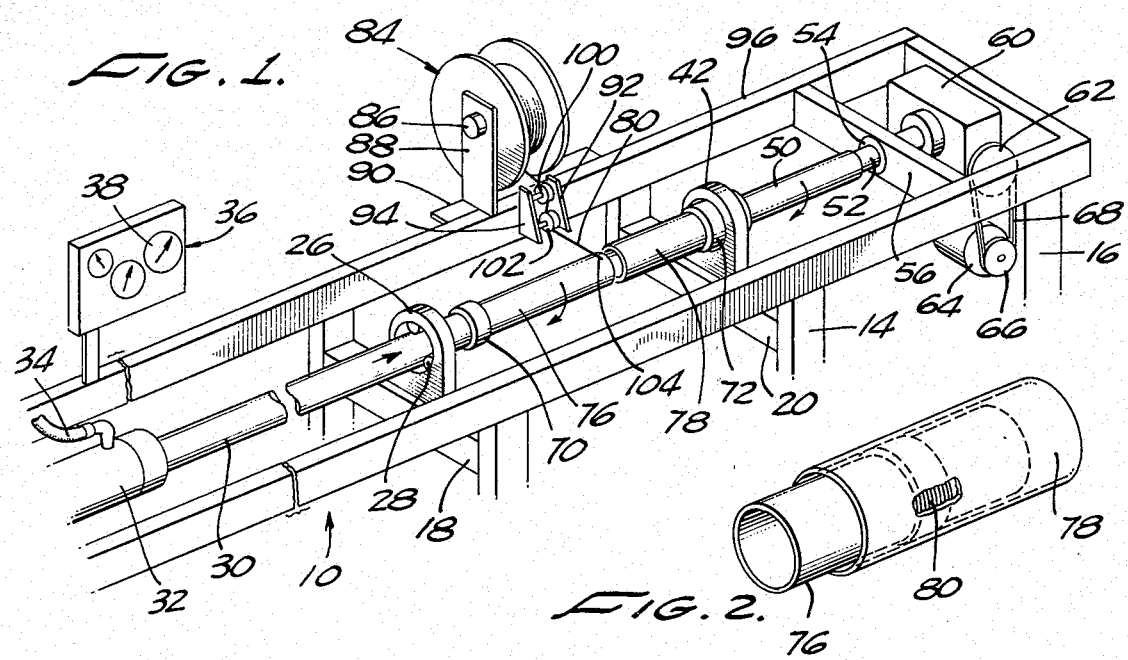

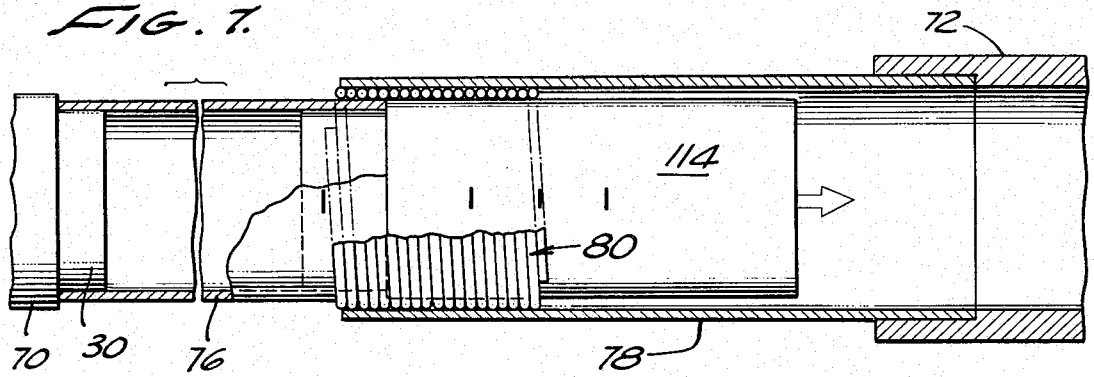
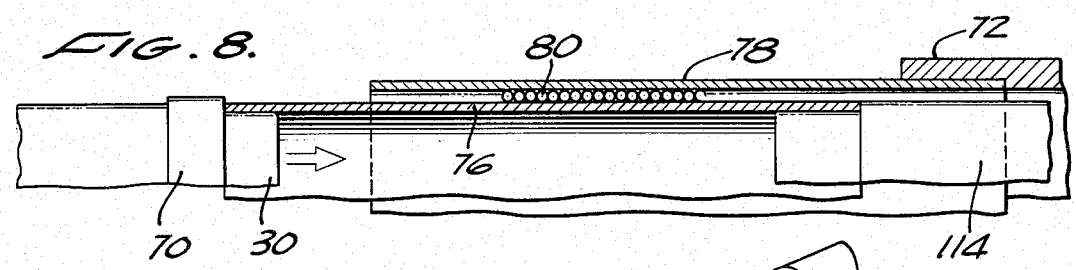
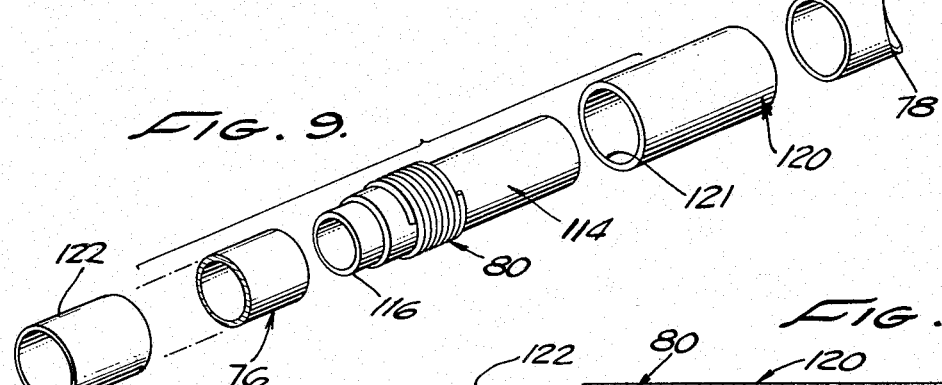
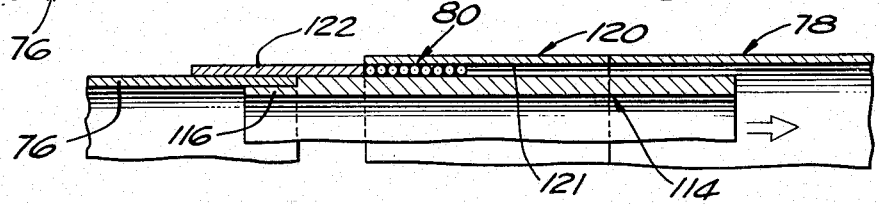
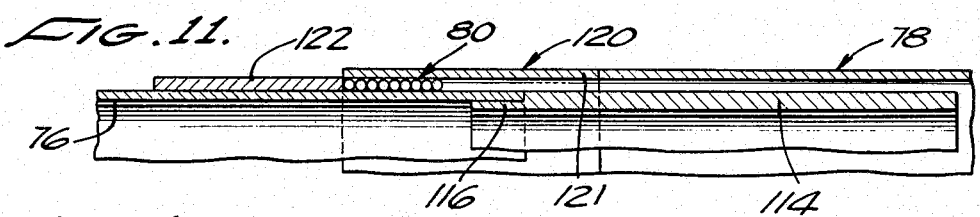
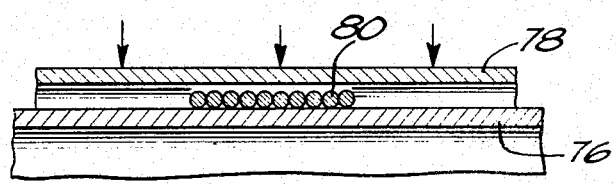

1

METHOD OF ASSEMBLING ENERGY ABSORBERS

RELATED APPLICATION

This application is a division of my copending application Ser. No. 311,299, now U.S. Pat. No. 3,851,374, filed Dec. 1, 1972.

SUMMARY OF THE INVENTION

The invention relates to a method of assembling energy absorbers and, more particularly, energy absorbers of the type such as shown in U.S. Pat. No. 3,369,634. Basically, this type of energy absorber comprises telescoping cylindrical members with an annular space between them. The energy absorbing elements are positioned in the space between the telescoping members. The herein invention is directed more particularly to a method of assembling that type of energy absorber wherein the energy absorbing member or means between the telescoping members is in the form of a helically wound wire having a plurality of convolutions. As explained in the prior patent referred to, when the telescoping members are moved axially relatively to each other, cyclic deformations of the convolutions of helically wound wires occurs. The convolutions rotate about their toroidal axes, that is, the internal central axis of the wire.

As will be understood from the prior patent referred to, the energy absorber may be constructed in various sizes, the annular space between the telescoping members having a given dimension radially. This dimension is such that the convolutions of the helical wire member in between are frictionally gripped or engaged by the telescoping members. Substantial amounts of energy are absorbed or dissipated as a result of the cyclic deformation of the wire convolutions when the telescoping members are moved axially relative to each other.

The herein invention embodies the concept and discovery of a method of assembling the energy absorber whereby the finished assembled product possesses the desired configuration and is otherwise ready for installation where needed. As can be appreciated, when considering the fabrication and production of many thousands of energy absorbers for industrial use, there was a compelling need for methods of assembly appropriate to the circumstances and conditions involved. The primary object of the invention is to provide and make available a method for assembling the energy absorbers characterized in that the method is simple, economical, easy to execute, and results in a finished product having the desired relationship between the parts.

A further object is to provide a method as is referred to in the foregoing, including the basic steps of helically winding the wire element and positioning the wire element in the annulus between the inner cylindrical member and the outer telescoping cylindrical member.

Another object of the invention is to provide a variation of a method as set forth wherein the helical winding is first made on the inner telescoping member. The outer telescoping member is heated to expand it, and it is then placed over the inner telescoping member and the winding. It is allowed to cool and shrink so that it grips the helical winding between the telescoping members.

BRIEF DESCRIPTION OF THE DRAWINGS

Further objects and additional advantages of the invention will become apparent from the following detailed description and annexed drawings, wherein:

FIG. 1 is a schematic perspective view of a machine on which the steps of the method can be executed, the machine providing means for rotating the parts during assembly and means for exerting an axial thrust;

FIG. 2 is a perspective view of an assembled energy absorber;

FIG. 3 is a sectional view of an absorber during assembly to the first example of the method;

FIG. 4 is a partial sectional view of an absorber during assembly in accordance with the first example of the method;

FIG. 5 is a sectional view taken along the line 5—5 of FIG. 3;

FIG. 6 is an exploded view illustrating the second example of the method of the invention;

FIG. 7 is a cross-sectional view of an absorber further illustrating the second example of the method;

FIG. 8 is a sectional view further illustrating the second example of the method;

FIG. 9 is an exploded view illustrating the third example of the method;

FIGS. 10 and 11 are sectional views illustrating the third example of the method; and FIG. 12 is a sectional view of an absorber illustrating the fourth example of the method.

DESCRIPTION OF THE PREFERRED EMBODIMENTS

EXAMPLE NO. 1

Referring to the drawings, FIG. 1 shows diagrammatically a preferred form of machine or apparatus in or on which the method can be executed. Numeral 10 designates a rectangular frame or bed supported by standards or uprights designated generally at 12, 14, and 16. Extending between uprights on opposite sides of the machine are transverse or horizontal members 18 and 20.

Transverse member 18 supports a pedestal bearing 26 which carries rollers shown at 28 and journaled in this bearing is cylindrical ram 30 which is movable axially within hydraulic cylinder 32 to which hydraulic fluid may be supplied by hydraulic lines, one of which is shown at 34. Hydraulic cylinder 32 and its control are conventional. Numeral 36 designates a panel or instrument board having instruments mounted on it, including pressure gauge 38 which indicates the hydraulic pressure present in cylinder 32.

Supported on transverse member 20, there is another pedestal bearing 42 in which is journaled a cylindrical stem as designated at 50 from which extends another cylindrical stem 52 of smaller diameter that is journaled in bearing 54 in transverse member 56. The end of stem 52 extends into a gear box or gear train 60 driven by pulley 62. Numeral 64 designates an electric motor having a drive pulley 66. There is a belt 68 which passes over pulleys 66 and 62 for driving gear box or train 60 and driving cylindrical stem 50.

At the end of ram 30 is a thrust bearing collar 70 of a size to receive or have fitted into it an end of inner cylindrical telescoping member 76 of the energy absorber. At the end of stem 50 adjacent to pedestal bearing 52, there is a collar 72 of a size to receive or have fitted into it the outer cylindrical telescoping member 78. It should be noted that thrust bearing collar 70 allows for rotation of all tubular elements 76, 78, 72, and 50 while the thrust is being applied from ram 30 which does not rotate.

Referring to FIGS. 2–11, description thereof is contained in my aforementioned copending application Ser. No. 311,299 filed 1 December 1972 and this description is incorporated herein by reference to the subject copending application.

This divisional application is directed to the form of method illustrated in FIG. 12. In executing this method, the helical wind of wire 80 is first made on inner telescoping member 76. Outer telescoping member 78 is heated in a suitable furnace to expand it due to thermal expansion to a diameter such that it will easily slip over helical winding 80 on inner telescoping member 76 in any desired position. Member 76 with the helical winding thereon and member 78 are brought together by conveyor means to a suitable point at which the outer member is simply slipped over the inner member and the helical wind and then allowed to cool so that the helical winding is gripped in the annular space between the inner and outer telescoping members.

From the foregoing, those skilled in the art will readily understand the nature of the invention, the manner in which the method is executed, and the manner in which all of the objects set forth are achieved and realized.

The foregoing disclosure is representative of preferred forms of the invention and is to be interpreted in an illustrative rather than a limiting sense, the invention to be accorded the full scope of the claims appended hereto.

I claim:

1. A method of assembling energy absorbers of the type comprising cylindrical inner and outer telescoping members having circular energy absorbing means positioned in the annular space between the members, comprising the steps of:

positioning said circular energy absorbing means on said inner telescoping member;

expanding said outer telescoping member to have an inner diameter larger than the outer diameter of said circular energy absorbing means positioned on said inner telescoping member;

positioning said expanded outer telescoping member around said circular energy absorbing means on said inner telescoping member; and shrinking said outer telescoping member onto said circular energy absorbing means.

2. The method of claim 1, wherein said outer telescoping member is expanded by heating and shrunk by cooling.

3. The method of claim 1, wherein said circular energy absorbing means are positioned on said inner telescoping member by winding a continuous element on said inner telescoping member into convolutions of the same size.

4. The method of claim 3, wherein said outer telescoping member is expanded by heating and shrunk by cooling.

5. The method of claim 1, wherein said circular energy absorbing means are positioned on said inner telescoping member by winding a continuous elongated element on said inner telescoping member into a helix having convolutions of the same size.

6. The method of claim 5, wherein said outer telescoping member is expanded by heating and shrunk by cooling.

* * * * *